United States Patent
Fotev

(10) Patent No.: US 8,713,003 B2
(45) Date of Patent: *Apr. 29, 2014

(54) SYSTEM AND METHOD FOR RANKING CONTENT AND APPLICATIONS THROUGH HUMAN ASSISTANCE

(75) Inventor: Krassimir Fotev, Harrison, NJ (US)

(73) Assignee: Peer Belt Inc., Harrison, NJ (US)

( * ) Notice: Subject to any disclaimer, the term of this patent is extended or adjusted under 35 U.S.C. 154(b) by 222 days.

This patent is subject to a terminal disclaimer.

(21) Appl. No.: 13/168,191

(22) Filed: Jun. 24, 2011

(65) Prior Publication Data

US 2011/0276568 A1    Nov. 10, 2011

Related U.S. Application Data

(63) Continuation-in-part of application No. 12/797,376, filed on Jun. 9, 2010, now Pat. No. 8,352,464.

(60) Provisional application No. 61/228,200, filed on Jul. 24, 2009.

(51) Int. Cl.
G06F 17/30    (2006.01)

(52) U.S. Cl.
USPC .......................................... 707/723; 707/707

(58) Field of Classification Search
USPC ............. 707/723–728, 707, 999.003, 999.01, 707/999.107
See application file for complete search history.

(56) References Cited

U.S. PATENT DOCUMENTS

| | | | |
|---|---|---|---|
| 7,065,587 B2 | 6/2006 | Huitema et al. | |
| 7,225,184 B2 | 5/2007 | Carrasco et al. | |
| 7,716,198 B2 * | 5/2010 | Meyerzon et al. | 707/706 |
| 7,716,217 B2 * | 5/2010 | Marston et al. | 707/728 |
| 7,725,465 B2 * | 5/2010 | Liao et al. | 707/728 |
| 7,783,632 B2 * | 8/2010 | Richardson et al. | 707/727 |
| 7,958,115 B2 * | 6/2011 | Kraft | 707/723 |
| 2005/0091202 A1 | 4/2005 | Thomas | |
| 2007/0112761 A1 * | 5/2007 | Xu et al. | 707/5 |
| 2007/0117622 A1 * | 5/2007 | Walker et al. | 463/29 |
| 2007/0260597 A1 | 11/2007 | Cramer | |
| 2007/0294240 A1 | 12/2007 | Steele et al. | |
| 2008/0016052 A1 | 1/2008 | Frieden | |
| 2008/0097985 A1 | 4/2008 | Olstad et al. | |

(Continued)

OTHER PUBLICATIONS

Ben Y. Zhao, et al. "Tapestry."—IEEE Journal on Selected Areas in Communications, vol. 22, No. 1, Jan. 2004.

(Continued)

*Primary Examiner* — Leslie Wong
(74) *Attorney, Agent, or Firm* — Lowenstein Sandler LLP; Ariel Reinitz

(57) ABSTRACT

Embodiments of a system and method are provided for ranking the contents of one or more documents, applications, sound or visual media through human assistance. The system includes one or more search engines configured to provide one or more documents, applications, sound or visual media based on a search query sent by a user. Further, the system includes a client application configured to capture the query sent by the user and the keyword tags provided by the documents, applications, sound or visual media author. The client application monitors one or more interactions of the user with the one or more documents, applications, sound or visual media for one or more events and provides a relevance measure to the one or more documents, applications, sound or visual media based on the captured query or tags, and the one or more events.

34 Claims, 9 Drawing Sheets

(56) References Cited

U.S. PATENT DOCUMENTS

| | | | |
|---|---|---|---|
| 2010/0299326 A1* | 11/2010 | Germaise | 707/728 |
| 2010/0317444 A1* | 12/2010 | Chandrasekar et al. | 463/43 |
| 2011/0022587 A1* | 1/2011 | Aravamudan et al. | 707/723 |
| 2012/0016860 A1* | 1/2012 | Jones | 707/706 |

OTHER PUBLICATIONS

Ion Stoica, et al., "Chord." The proceedings of ACM SIGCOMM 2001, San Diego, CA, Aug. 2001.

PetarMaymounkov, et al., "Kademlia." The proceedings of 1$^{st}$ International Workshop on Peer-to-peer Systems 2002.

* cited by examiner

SYSTEM AND METHOD FOR RANKING CONTENT AND APPLICATIONS THROUGH HUMAN ASSISTANCE

CROSS REFERENCE TO RELATED APPLICATIONS

The present application is a continuation-in-part of U.S. patent application Ser. No. 12/797,376, filed Jun. 9, 2010, which claims the benefit of U.S. patent application Ser. No. 61/228,200, filed Jul. 24, 2009, each of which are hereby incorporated by reference in their respective entireties.

TECHNICAL FIELD OF THE INVENTION

The present invention relates to improvements in electronic document, application, sound or visual media content rankings and more particularly to a computer-implemented system and method for managing user assisted ranking for document, application, sound or visual media relevance recommendations and searching.

BACKGROUND OF THE INVENTION

Digital electronic devices such as desktop computers, laptops, tablets, and smart phones have an ever-increasing amount of digital memory built into the device. As memory capacity increases, more and more specialized applications are being downloaded and installed. At the same time, the increased memory capacity allows storing more personal and licensed digital documents and sound or visual media content in the form of email, notes, presentations, spreadsheets, electronic books and magazines, songs, videos, clipbooks, pictures, tweets, Facebook posts, and web documents, to name few. Organizing and navigating such a collection of documents is not a straightforward task, especially when considering that discrete applications deal with each individual data type/piece. Further, in many modern smartphones, tablets, and operating systems, the document location is abstracted from the user by the operating system and applications. Due to such content location abstraction, the line between an application and content/data can become fuzzy.

Traditional content search approaches vary depending on the device, operating system, and application. Some adopt an approach of scanning document content/meta-information for matches upon user query entry (e.g., the Unix grep command line utility; Windows search in non-indexed locations). Other solutions index new content as the content is persisted on the device. Later these applications consult the index compiled to retrieve documents related to the user query. Typically the content indexing is offered by an operating system component, for instance Spotlight in Apple's Mac OS, Windows Indexing Service/Windows Search or specialized third party search applications like Google Desktop. These engines index all the well-known content available, working around the discrete content type/application "silo" problem. Despite the approach, search applications do not always perform well when it comes to delivering the most relevant results for a user query. Their weakness comes in part from their strength: they index all the content and consider that every document is created equal.

As the amount of information available on the device grows and the content search engine continues indexing the data, it becomes increasingly apparent that the limited number of slots on the search engine result screen will not always promote the most relevant documents for the user intended context of the search. The user query terms play an important role.

At one end of a spectrum, the user may enter too generic a query. While on the Web, the search engines can discriminate between pages based on authority rules typically involving inbound link statistics. However, on a single device no such external (to the user) authority exists. Too narrow a query may not return results at all or return a long document of potentially little relevance.

As an illustration, one may consider the impact of persistent Twitter sample feed data on Spotlight. In less than a month, within the sample data feed, virtually every English word may be found at least once. If the feed has been persisted locally, there is good chance it is also indexed. Due to the fact that feed files contain rich variety of English words, when searching for content, the user receives personal documents interleaved with data files from the Twitter sample feed! In fact, from experience, the Twitter sample feed files would even rank higher than the personal document being sought! This is a surprising result, considering that there is no interaction between the end user and the Twitter feed data files.

While the Twitter data sample is an extreme example, it nevertheless illustrates the problem of substituting the Twitter feed for PDF documents downloaded from the Web. While the content downloaded from the Web is important, a Word, Excel document or a Note related to the lookup query and written by the user his/herself, should in practice be considered far more relevant than content from any other party.

The above examples demonstrate that it would be advantageous for the level of user interaction to be considered when indexing and ranking documents on desktops, laptops, smart phones, tablets or any other computing device. The human interacting with the device should orchestrate the document ranking. In a good search application design, however, the user cannot be interrupted and asked to tag or provide explicit feedback on a particular document. Two reasons against such manual tagging/ranking are low coverage and annoyance. Further, explicit user based tagging can be incomplete or incorrect and may introduce spam due to the fact the user only considers a small subset of options while tagging.

With the advent of content provider/aggregator applications on mobile devices, it is apparent that not all applications on the market deliver the same user experience or the same quality content. There exists a need to discriminate between various applications. One frequently used measure of application relevance is the total number of application installations. However, the installation count comes to enforce a 'rich becomes richer' situation. Being late in the marketplace, even with a quality product, can require additional marketing and promotion (beyond those embedded into the application marketplace content promotion mechanisms) in order to succeed. For instance, in the oversaturated Apple App Store, it is rare these days for an application to be successful (that is, to achieve a large number of installations) by relying solely on user ratings and the search capabilities provided by the store.

The content ranking problem is also seen in application verticals, for instance in games. It is difficult to locate an engaging casual game. Startups emerge, aiming to solve the inefficiency.

Additionally, the problem of algorithmically ranking media content like pictures, video, sound, etc., remains largely undeveloped.

To summarize, the prior art in this technology domain present one or more of the following disadvantages:

(a) Document ranking is an artificial ranking algorithm that does not necessarily align with the user intent.

(b) Since inexact user queries are either too generic or too specific, due to the absence of an external authority the search engine (in the context of the device) provides less relevant documents, applications, sound or visual media as top recommendations in the result-set.

(c) Content bookmarking and tagging breaks the natural link between a lookup query and retrieved content and results in a rank that is not bound to the document semantics like the user or the author perceive it.

(d) Addressing the semantics problem by injecting relevant keywords during the manual tagging process introduces spam.

(e) Introducing content that is long, rich in words, and uninteresting in its current form, pollutes the search engine index and pushes content that is unique, user generated, and frequently interacted with out of the search results.

(f) Content or application stores/markets perpetuate a 'rich becomes richer' scenario and may slow down quality content and applications in reaching their targeted audience(s).

(g) Ranking media content remains largely undeveloped.

Systems and methods are therefore desirable to manage user assisted ranking for document relevance recommendations and searching.

It is with respect to these and other considerations that the disclosure made herein is presented.

SUMMARY OF THE INVENTION

The invention provides a system for ranking contents of one or more documents, applications, sound and visual media using human assistance. The system includes one or more search engines configured to provide one or more documents, applications, sound or visual media based on a search query sent by a user. Further, the system includes a client application or operating system component configured to: capture the query sent by the user; monitor one or more interactions of the user with the one or more documents, applications, sound or visual media for one or more events; and provide a relevance measure to the one or more documents, sound or visual media based on the captured query and the one or more events.

The invention further provides a method for ranking contents of one or more documents, applications, sound or visual media using human assistance. The method includes capturing a query sent by a user to a search engine for the one or more documents, applications, sound or visual media, wherein the query is captured by a client application or operating system component; monitoring one or more interactions of the user with the one or more documents, applications, sound or visual media for one or more events, wherein the one or more interactions are monitored by the client application; and providing a relevance measure to the one or more documents, applications, sound or visual media based on the captured query and the one or more events.

The invention further provides a computer-readable medium containing instructions executable by a processor for performing a method for ranking contents of one or more documents, applications, sound or visual media through human assistance. The method includes capturing a query sent by a user to a search engine for the one or more documents, applications, sound or visual media, the query being captured by a client application or operating system component; monitoring one or more interactions of the user with the one or more documents, applications, sound or visual media for one or more events, the one or more interactions being monitored by the client application; and providing a relevance measure to the one or more documents, applications, sound or visual media based on the captured query and the one or more events.

These and other objects and features of the present invention will become more fully apparent from the following description and appended claims, and/or may be learned by the practice of the invention as set forth hereinafter.

Figure 1A:
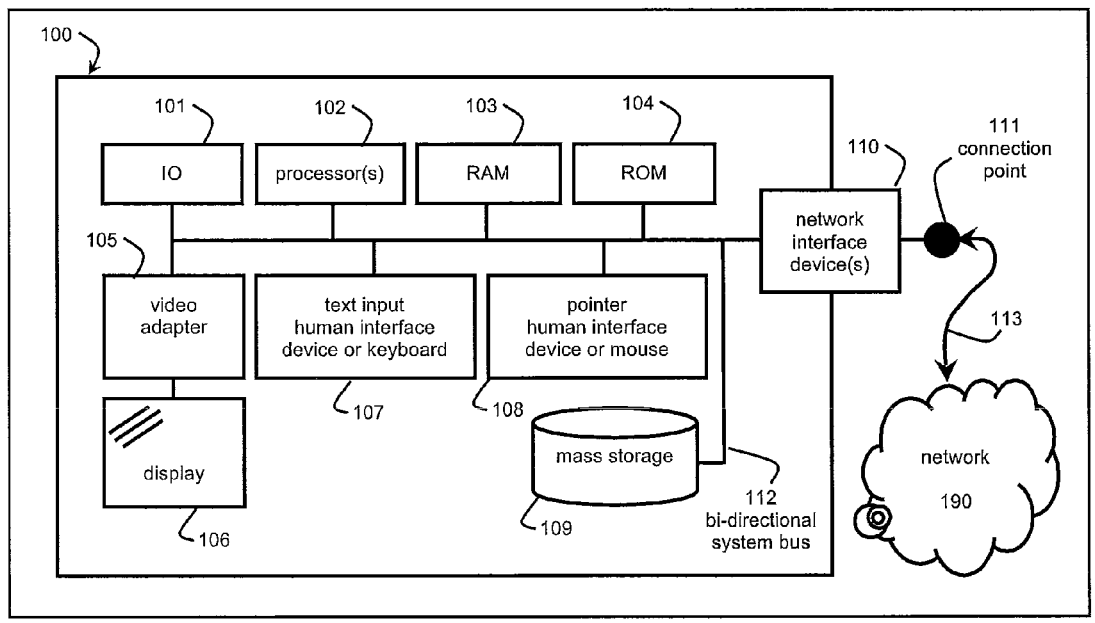
FIG. 1A is a block diagram illustrating an embodiment of a computing device in which an embodiment of the present invention can be implemented.

| DRAWINGS - REFERENCE NUMERAL |
|---|
| 100 - a computing device |
| 101-10 (input/output) unit |
| 102 - processor (one or more central processing units) |
| 103 - RAM (random access memory) where runtime application state is preferably kept |
| 104 - ROM (read only memory) assisting the system startup and diagnostics |
| 105 - Video adapter |
| 106 - Graphical display |
| 107 - A human interface text input device; typically a keyboard |
| 108 - A human interface-pointing device: typically a mouse |
| 109 - mass storage where operating system and application data is being persisted |
| 110 - one or more network interface devices |
| 111 - connection points exposed by one or more network devices |
| 112 - bi-directional system bus |
| 113 - network link |
| 120, 121, 122 - servers |
| 130 - a wireless router |
| 140, 141 - mobile phones |
| 150 - a network enabled gaming device |
| 160, 161, 162, 163 -computing workstation devices |

-continued

DRAWINGS - REFERENCE NUMERAL

190 - a network the network interface may send data to and receive data from
191 - a public network
192 - a public mobile phone network
200 - Software module - application running in its own separate address space, system component, or an application plug-in.
201 - Application or operating system shell search related user interface component
202 - Application or operating system shell lookup (search) bar and query
203 - Internet, local home/corporate or peer-to-peer network search engine
204 - Search result of interest
205 - User with a Human interface device
206 - Document
300 - Client application: a collection of monitoring piece 200, utility application 201 and state 301
301 - promotion
302 - Server
303 - Server farm
304 - Promotion store
400 - Requesting peer
401 - Listening peer promotion store
402 - Listening peer
403 - Additional listening peers
500A - Information hub: server or server farm
500B - Information hub: peer
501 - Recommendation looking peer(s)
700 - the document rank (relevance) measure as function of time
701 - document printing event and the associated event relevance jump
702 - document book-marking event and the associated event relevance jump
703 - the document relevance as function of time if no book-marking and printing events are considered
704 - the document relevance threshold value, above which a promotion request commences
800 - the document relevance measure as function of time
801 - the document relevance floor set by a prior document visit
802 - period of inactivity appears as a plateau in the document relevance evolution with time
902 - User fires a query against a search engine
904 - Query intercept
906 - The query executes on the search engine; optional
908 Query against promotion store (in parallel to 906 if 906 is being executed)
910 - Is there a recommended content for the query? (logical block)
912 - Both search engine and recommendation result sets displayed; optionally, only recommendation result are displayed
914 - User opens a result or recommended item (document, sound or visual media, application)
916 - Interaction between user and content
918 - Interaction events collected
920 - Content abandoned (closed)
922 - Relevance measure calculated
924 - Measure above critical value? (logical block; optional)
926 - Promotion request posted
928 - Wait for other document, sound or visual media, application or query
1001 - Local to the user (in the device memory or file system) promotional store
1002 - Promotional vector with keyword ("ranking"), content (document on the file system named "rank.doc"), and relevance measure (1.22 in this sample.

DETAILED DESCRIPTION OF CERTAIN EMBODIMENTS OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

A first embodiment of the invention is described with reference to FIGS. 1, 2, 7, 8, 9, and 10.

Embodiments of the invention described herein are generally directed to a computer-implemented system and method for electronic document content ranking and more particularly to a computer-implemented system and method for managing a user assisted ranking for document relevance recommendations and searching.

FIG. 1A is a block diagram illustrating an embodiment of a computing device 100 in which an embodiment of the present invention can be implemented. The computing device 100 can be a general-purpose computing device such a personal computer, a laptop, a Personal Desktop Assistant (PDA), a mobile phone, a tablet and so forth. A human-interface pointing device such as a mouse 108 and a human-interface text input device or a keyboard 107 are preferably coupled to a bi-directional system bus 112. The human-interface devices 107 and 108 can preferably enable a user to provide input to the computing device 100 and communicate the input to a processor 102. Other suitable input devices can be used in addition to, or in place of, the mouse 108 and the keyboard 107. An I/O (Input/Output) unit 101 coupled to the bi-directional system bus 112 represents I/O systems such as a printer (not shown), an A/V (audio/video) I/O (not shown), etc.

The computing device 100 includes a video adapter 105 with its own or shared video memory (not shown), a Random Access Memory (RAM) 103 where both an application comprising computer readable code and an application state are preferably stored at runtime, a Read Only Memory (ROM) 104 that is generally responsible for keeping system start-up computer readable code, a mass storage device 109, all coupled with the bi-directional system bus 112 along with the I/O 101, the processor 102, the keyboard 107, and the mouse 108. The mass storage device 109 can include either fixed or removable media, such as magnetic, optical, flash memory and/or any other available mass storage technology implementation. The computing device 100 can have an embedded or external video display adaptor 105 capable of presenting graphical and textual information to the user. A display 106 can connect to the video adapter 105 through a video amplifier (not shown). The video amplifier is well known in the art. One or more circuits convert digital pixels to a raster signal suitable for use by the display 106 that on its part displays a graphical image.

The computing device 100 can also include a network interface device 110 coupled to the buss 112. The network interface device 110 provides a two-way data communication coupling via a network link 113 through the device connection point 111. For example the network interface 110 can be a modem, a local area network (LAN) card, or a radio device. In any such implementation the network interface device 110 sends or receives electrical, electromagnetic or optical signals that carry digital data streams representing various types of information. More than one network interface devices 110 can be used. For example a Local Area Network (LAN) card can connect a computer workstation to the Internet (through an Internet Service Provider), while a wireless card can connect the workstation to a mobile device like a wireless enabled gaming device for instance.

The computing device 100 can send and receive data, including program code or web documents through the network link 113, the connection point 111, the network interface device 110 and the bus 112 to the processor 102 and then to the memory modules. The data received may be executed by the processor 102 and/or stored to the mass storage device 109.

Figure 1B:
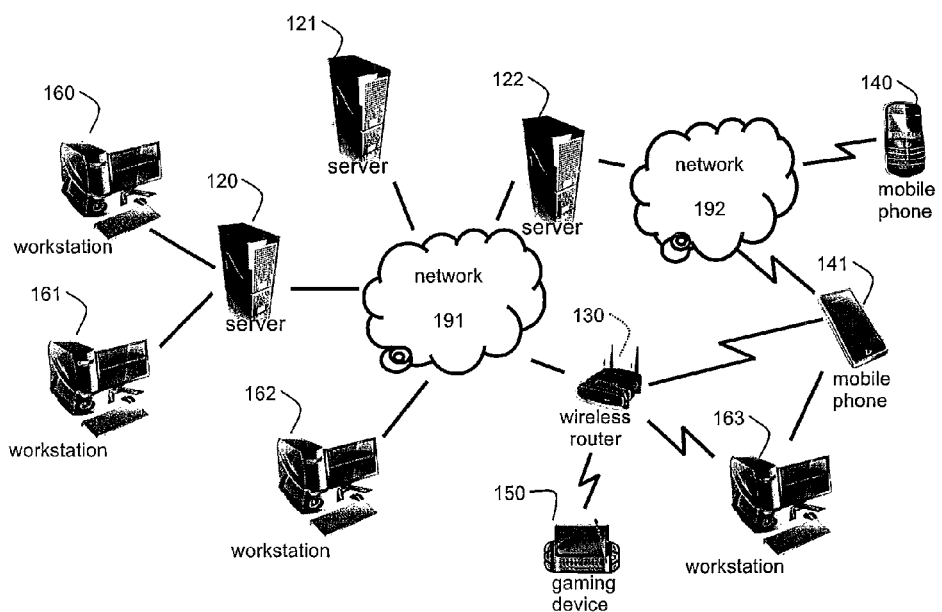
FIG. 1B is a diagram illustrating a typical distributed system in which an embodiment of the present invention can be implemented.

FIG. 1B is a diagram illustrating a typical distributed system in which an embodiment of the present invention can be implemented. As illustrated in FIG. 1B, the system includes a network setup with various types of computing devices linked through network interface components. For instance, computer workstation devices 160 and 161 connect to a public network 191 through a gateway or a proxy server 120. A computing device 162 and a server 121 are preferably directly linked to the network 191. A server 122 bridges the network 191 to a public wireless network 192. Through a public network 192, mobile phone devices 140 and 141 connect to each other or access resource of the public network 191, for example, the server 121. A wireless router 130 enables the mobile phone 141 to connect to a home or office local network. The wireless router 130 establishes a communication channel among a wireless network enabled gaming device 150, a workstation 163, and the mobile phone 141. Further, the mobile phone 141 may be connected through wired interface of a Universal Serial Bus (USB) to the workstation 163. The computing devices can receive and send data between each other by using the various network interfaces discussed above. In case of a web document, the processor 102 processes the data of the web document by using a computer application code commonly referred to as an Internet browser. Most modern network-enabled end-point computing devices include at least a basic browser implemented and available as an application code on them. In many applications, the browser component may be linked to or integrated within the application itself, allowing for a rich user interface based on the technology supported by the Internet Browser or its plugins (for instance Html, Abode Flash and PDF, Microsoft WPF/Silverlight, etc.).

Application code can be embodied in any form of computer product. A computer program comprises a medium configured to store or transport computer readable code or data, or in which computer readable code or data can be embedded. Some examples of computer product include CD-ROM discs, DVD disks, ROM cards, computer hard drives, flash memory, servers on a network, carrier waves, and other removable media. An embodiment of the invention can be implemented as computer software in the form of computer readable code execute in a general-purpose computing device regardless of whether the device is network enabled or not.

The computing device systems described above are for the purposes of example only. The current and alternative embodiments of the human assisted document content ranking and recommendations system and method can be implemented in any type of a computing device capable of rendering textual and/or graphical document data.

For the reminder of this document the terms 'relevance' and 'rank' are used interchangeably when related to a document, sound and visual media, application or underlying content.

Figure 2:
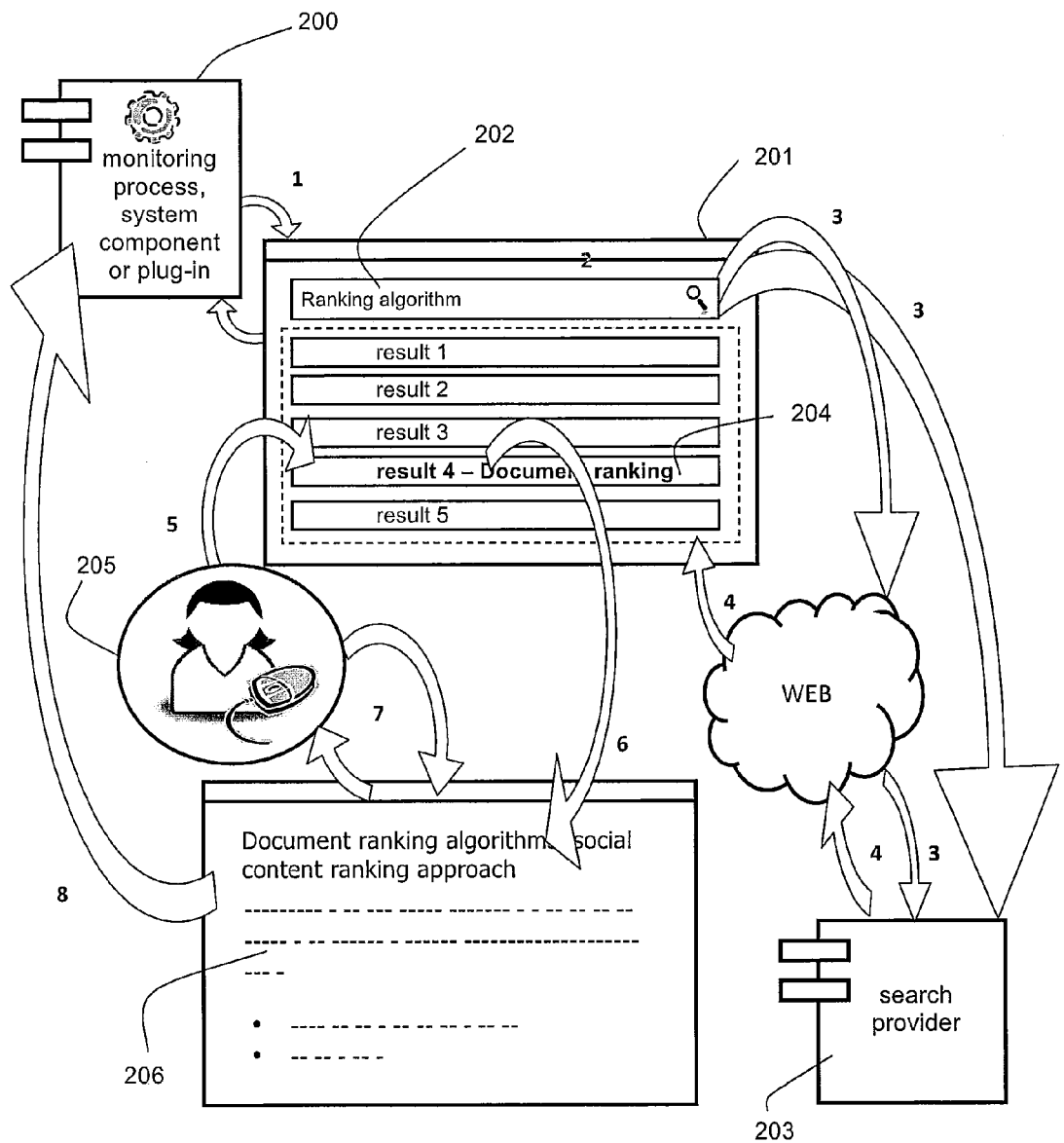
FIG. 2 illustrates a process of soliciting implicit human recommendations in the context of a search engine query.

FIG. 2 illustrates a process of soliciting implicit human recommendations in the context of a search engine query. Preferably, the monitoring process requires software to be installed on a client machine and run in parallel to or into the application 201. However, in certain arrangements the monitoring piece can be incorporated into the operating system core or into one of its application services thus eliminating the requirement to install additional software, as shown in FIG. 2. As illustrated in FIG. 2, a software module 200 monitors and records the search query 202 sent to a known search engine. Examples of the search engine can include, but are not limited to local Mac/iOS Spotlight, Windows Search, application specific search engine(s), external search engines such as Google, Yahoo, Bing, Facebook, Twitter or any other content aggregator or provider on the Web. A search bar can be located in the common operating system graphical shell or within the application itself. The software module 200 is an integral part of the operating system, implemented as an application plug-in, if the application architecture allows for it, statically linked into the application, or, in other arrangements, the software module 200 is implemented as a standalone application running in its own address space. The module is preferably capable of intercepting human interface events tied to an application. Such events include, but are not limited to: pointer or keyboard related scrolling, pointer clicks, zooming, keyboard data entry events, printing, saving, book-marking, copying document location, navigating away, switching to a different application or application tab (if the application organizes content in tabs). Apart from the richness of the events supported, other software module implementation details do not in any way limit the present embodiment.

Query 202 is sent to a search engine. The search engine can be running locally on the device (e.g., Spotlight, Windows Search, etc.), or be an external home/corporate/public or peer-to-peer network search engine 203. The search engine, depending on its location, is preferably contacted directly, via local network, or Web. The search engine then preferably returns one or more results. The list of related documents returned are rendered in the application adopted graphical user interface. Thereafter, a user 205 clicks on a search result of interest 204 to fetch a document 206 recommended by the search engine. The document 206 is loaded in the same or a new window provided by the application, or in a new instance of a viewer application suitable for viewing the particular document type (this is not limiting). More importantly, the module 200, alone or in collaboration with the viewer, preferably associates the current document with the query 202. The software module 200 preferably keeps a note of or otherwise records the association. Subsequently, the software module 200 monitors or screens the interaction of the user 205 with the document 206.

As a first step, the user 205 briefly reviews the document 206 to do a quick assessment of its content relevance. If the document 206 is deemed irrelevant by the user 205, the document view window can be closed if the document 206 was loaded in a separate window. In other arrangements, if the document 206 is deemed irrelevant, the user 205 can navigate away or back to the query results. The applications may be switched altogether, thus leaving the document for further inspection, but with close to no user interaction for a period of time. The time taken before navigating away or back can be approximately a second or up to few seconds depending on the length of the document 206. The word count, document fragmentation, and the like can be incorporated into the definition of the length of the document 206 for obtaining best results. During the skimming period, the user 205 can preferably scroll, adjust document window dimensions, device orientation, adjust fonts, etc. As a consequence, there is a period of active interaction with the document that leaves an event trace.

If the document 206 passes the initial screening process, the user 205 is likely to return to the title or section of interest in the document 206 and start inspecting it. Reading can take significantly more time than quick skimming of the document 206. In active reading interaction between the user 205 and the document 206, the event trace left may contain a few scrolling or clicking/tapping events over a longer period of time as compared to that of the skimming time period. This behavior demonstrates at least basic interest in the document content. In some cases, there may be no interaction after the initial screening. This indicates that the user 205 may be away from the device. A filter distinguishes reading from other activities of the user 205. Events like navigating away, switching to other applications or opening a new application instance leave a trail and can be processed easily. Similar considerations apply to applications being installed on the device. There is preferably a skimming period, during which the user tries to determine if the application is capable of solving the immediate problem as described in the query terms. As discussed herein, effective application length can be defined, so that the document considerations outlined are transferable to the application and media cases.

In case of an audio or visual media, the skimming period may have no rich event trace. The user can simply listen to or view the media file. Nevertheless, the initial seconds or minutes depending on the effective media length relate to content skimming, and prematurely interrupted playback in this period is indicative of little to no user interest in the media.

After reading or viewing the document 206 or a fragment of the document 206, the user 205 can go further: for instance the user 205 can bookmark the document location, content in the document, highlight portion of the document, or print the contents of the document 206. Printing can be a significant indicator of the relevance of document 206. Moreover, bookmarking, highlighting, and attaching notes also indicate the relevance of the document 206. Further, other interactions like saving, document address copying, frequent document visits in a relatively short time period (bursts) also signify the importance and/or relevance of the document 206.

In addition to fetching a document through a search engine, the user can type the document location directly, or use a document location shortcut/bookmark. In this case, the semantic domain of the document is preferably defined by the tags provided by the document author his/herself. The document title, meta tag keyword, meta tag description and/or other author provided tag(s) play the same role as the user typed query to a search engine in defining the perceived semantic domain of the document.

An objective measure of the relevance of document content (individual or generalized "document" as discussed above) may not have a linear relationship with the interaction time of a user. For example, a user 205 can read a document 206 once and then reread the most significant portions of the document 206 again. It is possible that the second reading consumes approximately the same amount of time as the first reading. As a result, the overall time spent on the document 206 can be close to two fold the time spent on the first interaction. However, this does not necessarily indicate that the document 206 is two-fold more relevant, since it was examined twice in a single user interaction. Therefore, beyond a certain threshold, the objective measure for the interaction time can be defined as increasing slowly with time. One simplistic choice is a logarithm function, however, other functions that slowly increase over time can also be selected.

The objective measure $m_{(context, document)}$ for the document rank (relevance), in the context of the last query, or author defined tags can be described mathematically as:

$$m_{(context, document)} = \left( \begin{array}{c} a_0 \log\left(b\frac{t}{l} + c\right) + a_1 \delta(P) + a_2 \delta(B) + \\ a_3 \delta(S) + a_4 \delta(C) + a_5 \rho_T(V) \end{array} \right) \exp(-D(1-L))$$

where: t is the cumulative document interaction time with the period of inactivity excluded; l is the effective document length, the $$\delta(P) = \begin{cases} 1 & \text{if printed} \\ 0 & \text{if not printed} \end{cases}$$

is the document printed Dirac measure; $\delta(B)$, $\delta(S)$, $\delta(C)$ are the document bookmarked, document saved, document location (Uniform Resource Identifier—URI; Uniform Resource Locator—URL; file location; database location; library location; etc) or portion of the document content copied (or highlighted, for instance) Dirac measures respectively; $\rho_T(V)$ is the average document view density since first seen; L is the number of links followed since the engine result list page; D determines if documents visited via navigation through the chosen search results should be considered as related to the original query or not; $a_{0-5}$ are coefficients determined experimentally that define the weight of each document relevance indicator. The coefficient values may vary from user to user reflecting the fact that different people interact with documents and organize information in different ways. The exp(−D(1−L)) adjustment reflects the fact that the further one moves from the query result page, the less correlated the initial context and the currently viewed document may be. As previously discussed, the logarithm in the $$\log\left(b\frac{t}{l} + c\right)$$

member can be easily substituted with another slowly function that increases slowly over time.

As previously discussed, the effective document length definition can vary by document type. For instance, one defines effective length as a word or paragraph count for a text-type document, a non-empty cell count for spreadsheets, a data-series and/or experimental point count superposition in charts, a length in time for videos and audio, one of the generalized dimensions for pictures, and so forth. A sample document view density definition, provided for illustrative purposes, is:

$$\rho_T(V) = \log\left(e_T \frac{\sum \delta_T(V)}{1 + t - t_0} + 1\right)$$

where $$\delta_T(V) = \begin{cases} 1 & \text{if viewed in a given day} \\ 0 & \text{if not viewed in a given day,} \end{cases}$$

t is today's date, $t_0$ is the day the document was first viewed, $e_T$ is a constant dependent on the time slot T used. Instead of using a daily time slot T one can choose to define $\rho_T(V)$ using hourly, weekly, bi-weekly, monthly, and generally arbitrary time slots. It can depend on the target audience, and document type in terms of semantics. The present embodiment preferably relies upon hints from the context in order to determine what time interval is most suitable. If the document semantics cannot be determined from the context and document content, the view density can be ignored while calculating the document rank, or a default time slot (if defined) can be used.

Alternative embodiments monitor different discrete and aggregate document sets via density event sets. Even in the pure document embodiment discussed herein, if the document is writable, the user's edits should preferably be accounted for. The edits originate from discrete keystrokes. However, the keystrokes need to be aggregated to arrive at a correct representation of the document importance to the user. Edit density ρ(E) can be defined by simply counting the keystrokes and limiting the importance of lengthy edits like, for instance, in $$\rho(E) = \log(e_{E1} \Sigma \delta_T(E) + 1)$$

where $e_{E1}$ is a coefficient, $\delta_T(E)$ is the count of keystrokes in during the time T the document was active (in focus) on the screen. Other definitions can count time-slots instead of actual keystrokes such as in the view density sample. The effective document length can be incorporated, reducing an individual edit's importance within a large document. Furthermore, results of different definitions can be used and switched between during actual document lookup triggered by a user query.

In more generic form the objective document relevance measure can be expressed as:

$$m_{(context, document)} = \left( a_0 \log\left(b\frac{t}{l} + c\right) + \sum_{i=1}^{N_{DE}} a_{DE_i} \delta(DE) + \sum_{i=1}^{N_{CE}} a_{CE_i} \rho_{CE_T}(CE) \right) \exp(-D(1-L))$$

where $$\sum_{i=1}^{N_{DE}} a_{DE_i} \delta(DE)$$

is the sum of the discrete events with their corresponding weights $a_{DE_i}$, $$\sum_{i=1}^{N_{CE}} a_{CE_i} \rho_{T_{CE}}(CE)$$

accounts for the countable events (keystrokes; document open, save count, etc) with their corresponding weights $a_{CE_i}$, and densities $\rho_{T_{CE}}$ within a time interval $T_{CE}$ are dependent upon the countable event type CE.

Taking into account that the discrete events are in fact bound to a special kind of density function, document relevance can be defined in even more generic form as:

$$m_{(context, document)} = \left( a_0 \log\left(b\frac{t}{l} + c\right) + \sum_{i=1}^{N} a_{E_i} \rho_{E_T}(E) \right) \exp(-D(1-L))$$

where E denotes dependence on the event type.

The measure and document length as defined herein, are merely illustrative and should not be considered limiting. $m \langle_{context, document}\rangle$, t, and $\rho_T(V)$ can be defined using other expressions. However, this does not obscure the fact that human interaction with the document is highly valuable evidence for determining document rank. The rank only makes sense in a context defined by the user with a query, tag or by the content author him/herself. As will be demonstrated in alternative embodiments, context may take broader and more abstract form. Further references to "query" relate to a user query, author defined tags, or the broad context discussed in the alternative embodiments. Once the measure is calculated, if, for a given ⟨ context, document⟩ vector, the measure exceeds a threshold value $m\langle_{context, document}\rangle^{critical}$ then the vector should preferably be promoted.

Figure 7:
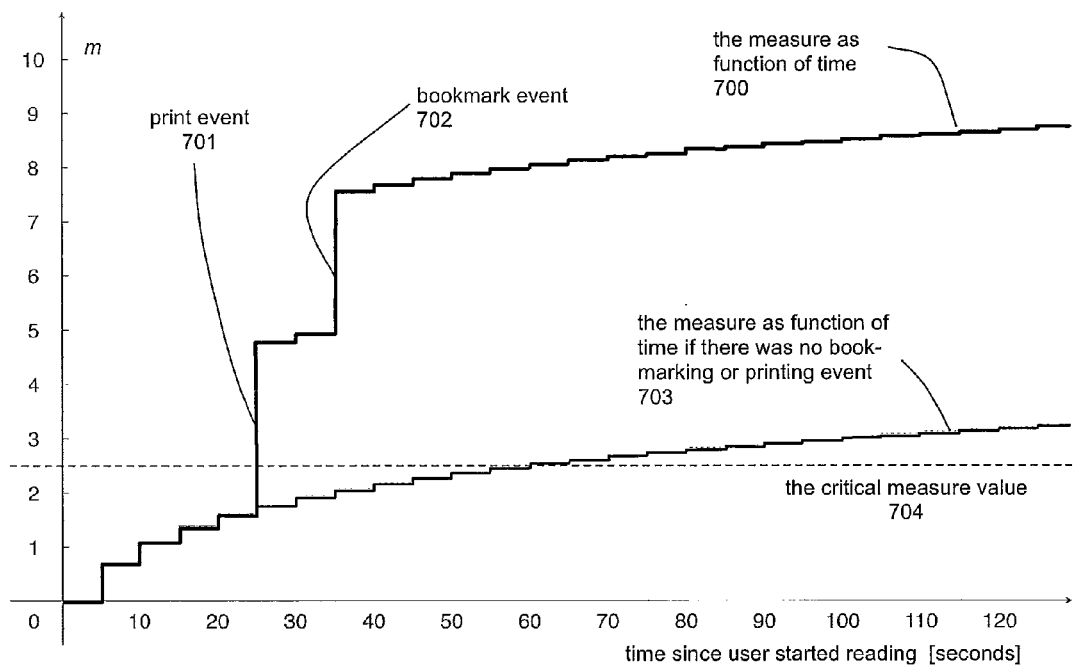
FIG. 7 illustrates a user document interaction that results in the document rank to be evaluated above the threshold measure value in accordance with an embodiment of the invention.
Figure 8:
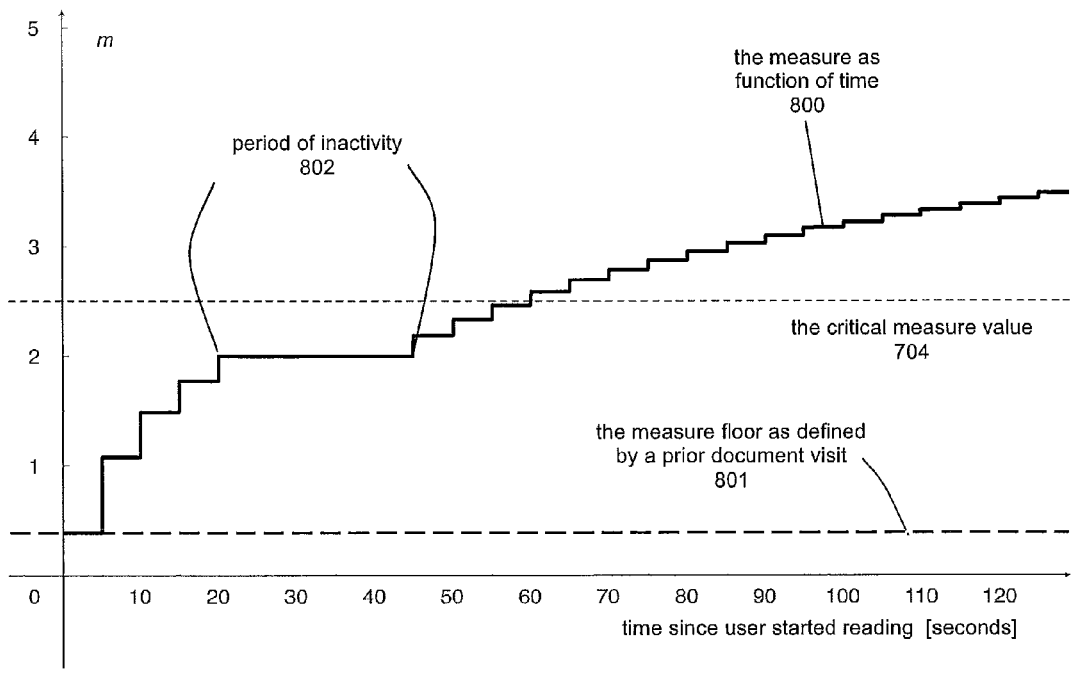
FIG. 8 illustrates a user document interaction that results in the document rank to be evaluated above the threshold measure value in accordance with an alternative embodiment of the invention

FIG. 7 and FIG. 8 both illustrate exemplary user document interactions that result in the document rank to be evaluated above the threshold measure value, $m\langle_{context, document}\rangle^{critical}$ and a promotion request sent as a consequence. The coefficient values used during the executions can be, for example:

$$a_0 = 2.3; a_1 3; a_2 = 2.5; a_3 = 2.5; a_4 = 0.5; a_5 = 0.4$$

The above coefficient values indicate that the action of printing the document 206 was given a higher weight than saving or bookmarking the document 206. The URL or content copying was not considered too significant as there is no evidence whether the copied URL or content was actually used later in an email, a document, a social networking site, etc. The prior visit factor accounts for visits on the same day and was given relatively low weight as well. The events are collected continuously, and are pushed to single element slots by event type and evaluated at 5-second intervals. Accordingly, the graphs of FIGS. 7 and 8 depict discrete steps. As illustrated in FIG. 7, a printing event 701 and a bookmarking event 702 occur at a time difference of 10-15 seconds. The printing event 701 alone increases the document relevance measure 700 above the threshold measure value $m\langle_{context, document}\rangle^{critical}$ 704, which is set to 2.5 during this exemplary execution. The bookmarking event 702 confirms the document relevance, however, it may not be required in the present case for a promotion request to be initiated.

FIG. 8 illustrates an exemplary interaction between the user 206 and the document 206 during a same day but at a later time. In this interaction, there are no bookmarking or printing events, however, a relevance floor 801 is set by the earlier visit. Further, there can be, for example, a 20 to 30 second period of inactivity 802 that appears in the form of a plateau as a document relevance measure 800 evolves with time.

It should be noted that the exemplary executions illustrated in FIG. 7 and FIG. 8 and the parameter values listed should not be considered as limiting the embodiment and are provided here as illustrations only.

There are a variety of embodiments in which the ⟨ context, document⟩ vector promotions may be persisted and later used. They depend in part upon the document and lookup index location, as well as application type. They can preserve the calculated relevance measure or its more spam resistant derivative reference count, for instance.

Figure 10:
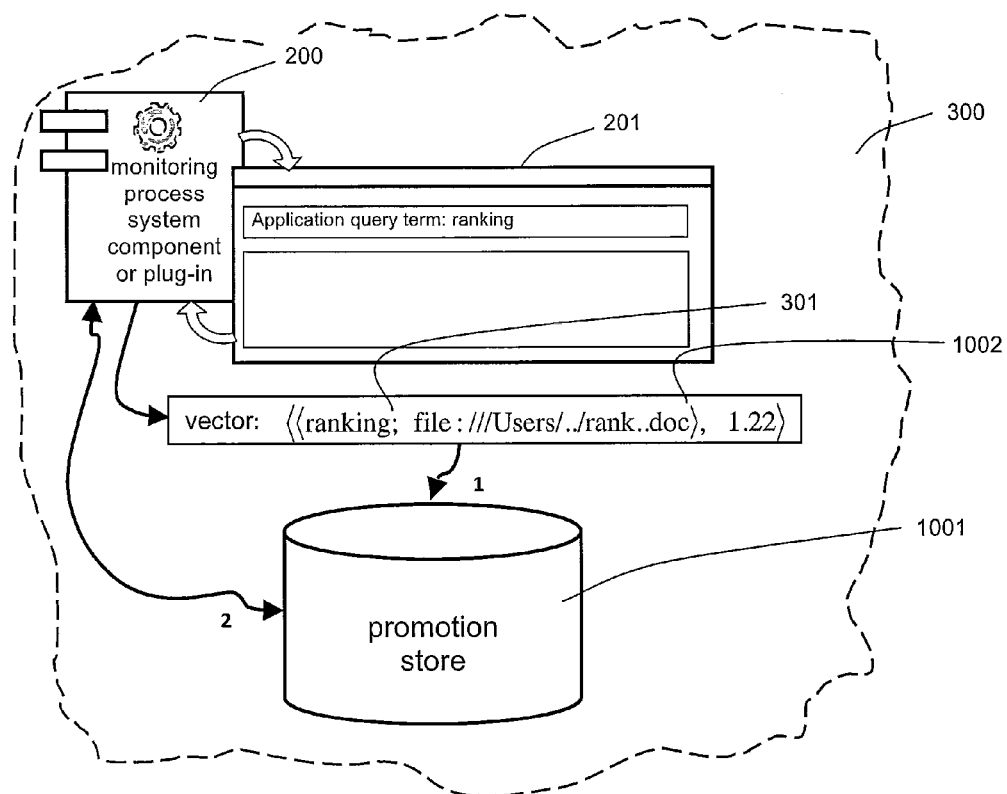
FIG. 10 shows a process for persisting a document recommendation in accordance with an embodiment of the invention.

According to the first embodiment a typical data storage scheme within the device boundaries is used as illustrated on FIG. 10. The document promotional store 1001 resides in the device memory (persistent or not) and implements a key-value pair where the key is on the context-document pair 301 and the value 1002 is the calculated relevance (or the number of visits this context-document pair was found to be above the critical relevance threshold). Whenever the user attempts to locate the most relevant content for a particular query, the module 200 captures the query and executes a search against the local store locating the top n documents most relevant to the user query results. The actual store lookup embodiment should not be considered limiting, as various embodiments can adjust the cached relevance, thereby affecting the final ranking. For instance, if an exact query match cannot be found, the system and method can resort to extracting documents for related queries. Ranking documents for multiple different related queries can be achieved in part through one or more ranking adjustment(s). Adjustment procedures that utilize term frequency analyses and statistics, and/or adjustment absence can allow for "borrowing" results from related queries, where an exact query match is not present. In any event, the ranking basis is preferably defined by the passive user activity when working with the document.

An alternate embodiment of the invention is described with reference to FIGS. 1, 2, 3, 5, 6, 7, 8 and 9.

The alternative embodiment discusses using a different persisting vector and vector store querying mechanism. However, the requirement for monitoring human document interaction, as discussed in conjunction with FIG. 2, the document rank measure calculation as discussed and illustrated in conjunction with FIGS. 7 and 8, the requirement for an internal vector store rank, and generally all the discussion not tied directly to FIG. 10, remain valid and in effect for the alternate embodiment.

Figure 3:
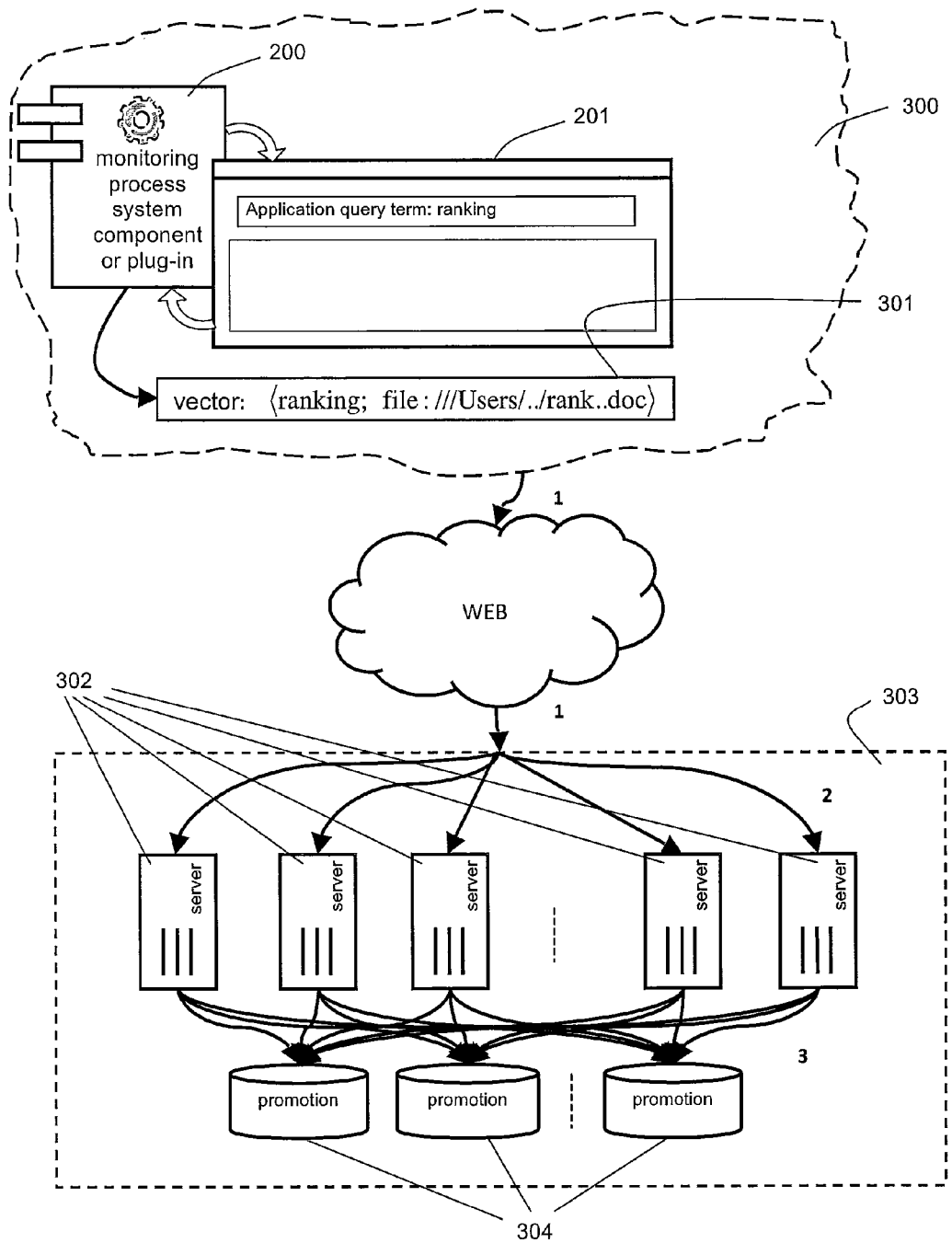
FIG. 3 shows a process for persisting a document recommendation in accordance with an embodiment of the invention.

In an alternative embodiment a client/server application scheme is used as illustrated in FIG. 3. FIG. 3 shows a process for persisting the document 206 recommendation in accordance with an alternative embodiment of the invention. In FIG. 3, a client application 300 comprises the application 201, the software module 200, and a vector 301 as an internal state. The actual client calculated rank is not part of the vector, since such a rank presence can promote spamming. Further, the client promoting the vector 301 sends a request to a server farm 303 or directly to one of servers 302. Servers 302 or a server farm 303 accepts the request after considering and ruling out potential spamming. Spamming can be mitigated by limiting the number of promotions a client is entitled to in a given day, week, or month, e.g., by introducing a document promotion quota. The client can be identified by an IP address, user name or any other such registration information, if the software module has support for such user information or registration, by an installation identifier if the software module distribution can assign one during the download/installation process, or by other means, such as a domain account, if both server and client run on a local network. The actual means for identifying the client may not be of great significance, however the identification can assist in spam protection and prevention.

After the request is received on one of the servers 302 and spamming has been ruled out, the servers 302 checks whether the vector 301 exists at promotion stores 304. In case the vector 301 is absent, it is added to the promotion stores 304. While persisting the vector 301, the servers 302 can add a promotion counter to it. The promotion counter is added as there can be queries that are used frequently.

In case the vector 301 exists in the promotion stores 304 and the vector 301 includes a promotion counter, then the promotion counter is incremented. In an embodiment of the invention, various promotions for different documents can take place due to document oversaturation in a particular query area. Therefore, choosing the top 10, 20 or 100 documents can be difficult without introducing a ranking system that is internal to the promotion stores 304. In another embodiment of the invention, document oversaturation can be managed by organizing a first-in-first-out queue. Therefore, an internal store ranking system is required for the vector 301.

In an embodiment of the invention, the measure $m \langle _{context, document} \rangle$ is an integral part of the vector 301. Therefore, instead of sending the vector 301, the requester makes a promotion request with the vector 1002 $\langle$ context, document, $m \langle _{context, document} \rangle \rangle$. The measure is readily available and can be accumulated on the servers. Accordingly, the document relevance for a given query becomes the sum of the individually reported measure $m \langle _{context, document} \rangle$.

Figure 5:
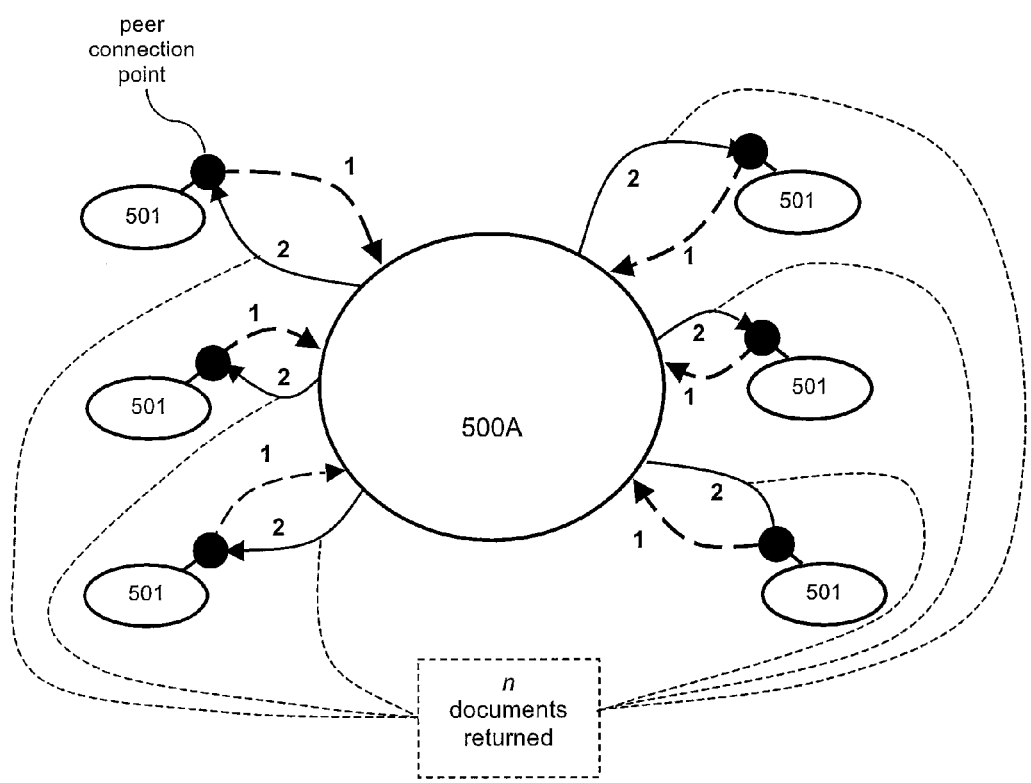
FIG. 5 shows a process for extracting recommendations in accordance with an embodiment of the invention.
Figure 6:
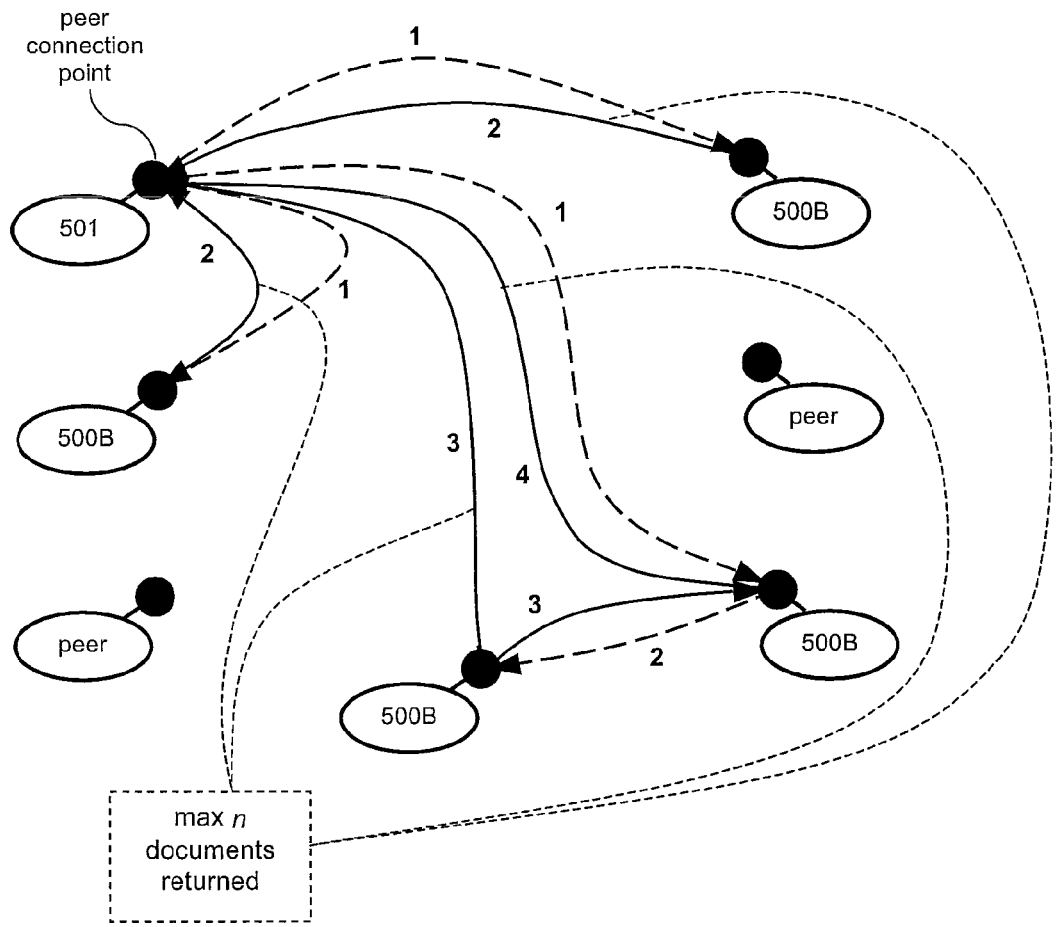
FIG. 6 shows a process for extracting recommendations in accordance with an alternative embodiment of the invention.

Querying the vector store generally depends upon the arrangement for the vector index and the network topology. In the present embodiment, a high-level document store querying process is illustrated in FIG. 5. A peer 501 looking for recommendation is capable of intercepting a query sent to a search engine. After the interception of the query, the client runs a query parallel to a vector store server or hub 500A. The hub 500A queries its internal store for the term being sought and returns back to the client the n highly ranked documents for the phrase. The actual value for n is based on a requesting peer preference and can be provided as a configuration option. A good default value for n can be in range from 5 to 100, however, this should not be considered limiting to the embodiment.

Once the search engine results and articles recommended by hub 500A are available, the client preferably adjusts the search engine user interface and/or shows the recommendations directly (not shown). Moreover, the client can adjust the search engine user interface and displays the server 500A recommendations in a separate application window, custom toolbar, or displays only the 500A recommendations (not shown). As needed, the software module 200 enables the simultaneous display of two or more recommendation streams without the need to install or explicitly query an additional search engine.

As relevance data for a particular document accumulates, a semantic domain can be defined for the document based on the collected recommendations. Further, considering the accumulated query statistics and the associated recommended documents, relationships can be uncovered which can further expand or contract the document semantic domain. The Bayesian statistics that are well known in the art can be used by one or more embodiments for such analysis.

Yet another alternate embodiment of the invention is described with reference to FIGS. 2, 4, 6, 7, 8 and 9.

The alternative embodiment relates to using a different vector persisting and vector store querying mechanism. However, the requirements for monitoring human document interaction as discussed in conjunction with FIG. 2, the document rank measure calculation as discussed and illustrated in conjunction with FIGS. 7 and 8, the requirement for an internal vector store rank, and generally all the above discussion not tied directly to FIGS. 3, 5 and 10 remains valid and in effect for the alternate embodiment.

The alternate embodiment of the invention relates to a different network topology. In contrast to the discussion in FIG. 3, the alternate embodiment is based on a peer-to-peer network as a vector store. As a result, the vector store is distributed over multiple peers. The peer network organization and peer name resolution is of great importance when it comes to latency, network attack resilience, network stability, fragmentation, etc. In the alternative embodiment a generic second generation (distributed hash table) peer-to-peer network is considered. A few such peer-to-peer networks exist currently. For example, the peer-to-peer networks discussed in Tapestry (Ben Y. Zhao, et al.—IEEE Journal On Selected Areas In Communications, Vol. 22, No. 1, January 2004), Chord (Ion Stoica, et al., The proceedings of ACM SIGCOMM 2001, San Deigo, Calif., August 2001), Pastry http://research.microsoft.comiantr/Pastry/, Kademlia (PetarMaymounkov, et al., The proceedings of 1st International Workshop on Peer-to-peer Systems 2002), and Microsoft PNRP (U.S. Pat. No. 7,065,587 to Huitema et al, (2006)), and so forth, each of which are incorporated by reference in their respective entireties.

Figure 4:
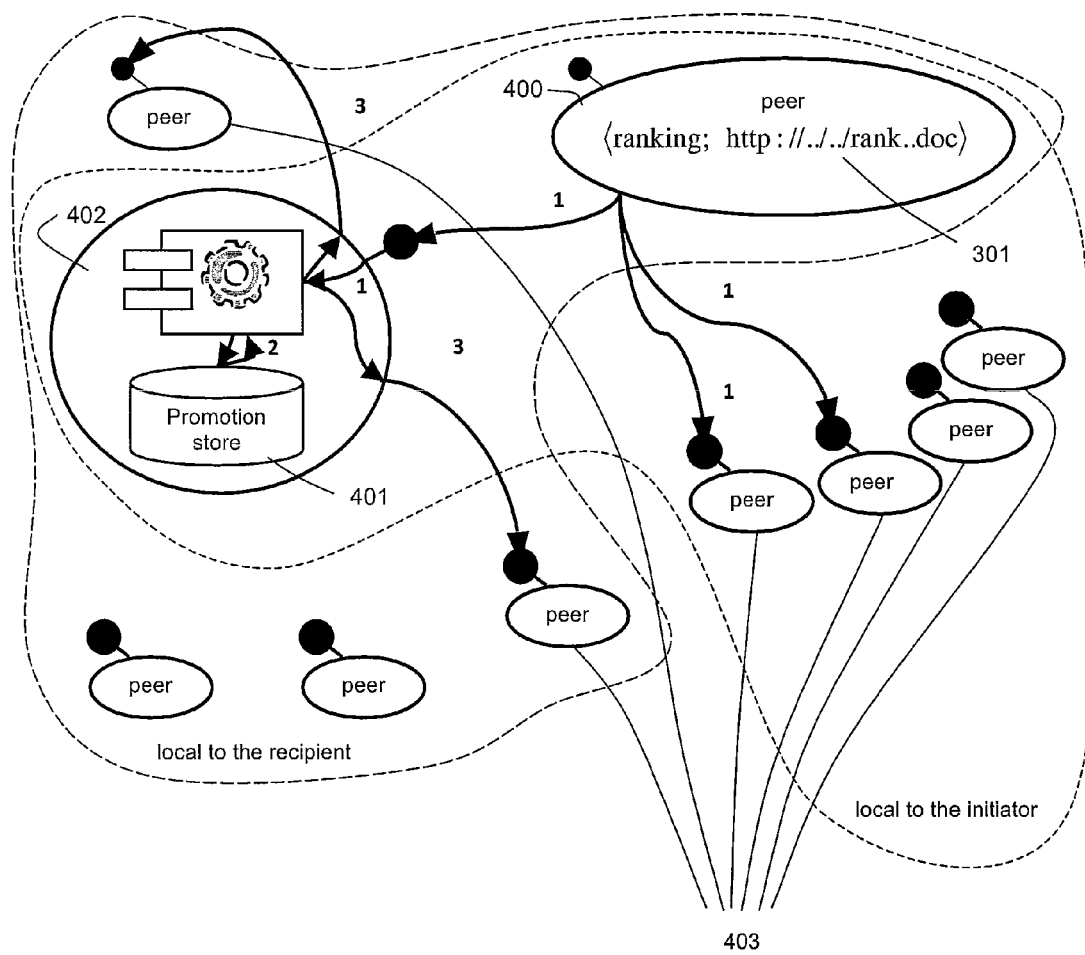
FIG. 4 shows a process for persisting a document recommendation in accordance with an alternative embodiment of the invention.

In the peer-to-peer network, as illustrated in FIG. 4, each requesting peer 400, listening peer 402, and additional listening peers 403 maintains their own promotion stores. The listening peer 402 includes a promotion store 401 as illustrated in FIG. 4. The promotion store 401 comprises the promotion vectors 301. In the store 401, there may or may not be a promotion counter associated with the vector rank value. The promotion counter is recommended in case of document oversaturation as discussed above, however, this does not limit the embodiment. A promotion request involves sending the ⟨ context, document⟩ vector to a subset of p peers 402, 403 in the local neighborhood of q peers. The p/q ratio is determined experimentally, but any value in the range of 0 to 1 can generally produce an optimal result. In a case where the vector 301 does not exist in the receiving peer vector store 401, the vector is injected into the vector store 401 and persisted. In a case where the vector exists in the vector store 401, which can be because of other peer promotion or self promoted content, then the request can be forwarded anonymously to the receiving peer neighborhood at the discretion of the receiving peer. However, the receiving peer neighborhood may not match the neighborhood of the promotion-initiating peer. Therefore, the visibility of the relevant vectors can be increased over time as they propagate through the network. However, spam and spamming peers have to be considered carefully. In an embodiment, spam can be isolated into small subsets of the network by limiting the forwarding of promotion requests. At the same time the overall network can be considered spam free. The spam penetration depends on the network topology, peer resolution and forwards ratio. Fewer forwards lead to less spam, but also lead to a slower increasing of the document visibility over the time.

Extraction of recommendations uses a different mechanism in case of a distributed index. In the peer-to-peer arrangement illustrated in FIG. 6, the requesting peer 501 sends the intercepted search engine query (not shown) to peers 5008 in the neighborhood. Each peer queries a local vector store (not shown) and returns up to n documents. As previously discussed, different algorithms may be used to select the best n documents. Moreover, the value of n is configurable by the user. An optimal default value for n can be in the [1; 5] range. In case no document is found, the receiving peer at its discretion can forward the request to its neighbors. The fetched documents are sent directly back to the request initiator if the network topology permits. However, firewalls may have to be configured to allow this request. Moreover, other criteria can be considered, such as privacy concerns, etc. Thereafter, the response flows through the forwarding peer to the original requester.

During early stages, when there are only a few peers in the network, a hybrid schema can be implemented, in which ⟨ context, document, rank⟩ triplets 1002 are stored together into one or more hubs. The rank may be in form of, but not limited to promotion request counts or cumulative m⟨ $_{context, document}$⟩ from the promotion request. The content rich multiple hubs locate the relevant documents for a portion of content by targeting key phrases. Multiple hubs enable scalability of the system. The setup, in a case of multiple hubs, is a superposition of the setup and mechanism discussed in conjunction with FIG. 5 and FIG. 6. In this case, the setup may initiate, as discussed in FIG. 5, comprising a few hubs 500A. Subsequently, as more content is added and/or offloaded from the hubs 500A to the peers, the setup can migrate to the setup discussed in FIG. 6 comprising a pure distributed vector store. In an embodiment, the hybrid scheme can remain active for a longer time to provide a new content injection mechanism. The content appearing in the top results of the search engines has to be relied on, in case the content injection is not an integral part of the setup. However, this can be problematic in terms of recognizing the true value of the human assisted document content ranking.

An alternate embodiment of the invention relates to ranking applications, sound or visual media content. However, the requirement for monitoring human document interaction as discussed in conjunction with FIG. 2, the document rank measure calculation as discussed and illustrated in conjunction with FIGS. 7 and 8, the requirement for an internal vector store rank, and generally all the above discussion remain valid and in effect for the alternate embodiment.

In an alternative embodiment, sound or visual media relevance is measured rather than textual document relevance. In the case of a sound or video, time length is a substitution for a document length. In case of static media content, e.g., images, an objective measure such as content fragmentation on the screen or in a frame is a valid substitute for document length. The fragmentation is objectively defined in this embodiment. For instance, edge dependent metric that is well know in the art can be used (Peters II et al, Image Complexity Metrics for Automatic Target Recognizers, 1990 Automatic Target Recognizer System and Technology Conference, Naval Surface Warfare Center, Silver Spring, Md., 30-31 Oct. 1990). The media tags provided by the author, or publicly available concise tweets (Twitter short messages) or blog media description(s) can define the context in the currently discussed embodiment. The actual context definition may vary, but is not limiting.

In an alternative embodiment the relevance of gaming applications is measured. In the gaming embodiment, a substitute for document length can be level count. Each game level can further be subdivided in smaller fragments and a user interaction level can be measured in these smaller fragments. For purposes of illustration, this is like defining document length in paragraphs and average paragraph length instead of symbols or words. The context here is the game title, other publisher provided metadata, or a discovered concise game tweet or blog description, for instance.

In an alternative embodiment, application relevance is defined and measured. Before defining the document length substitution in the application case, it is important to recognize that there are at least two major application categories.

The first category contains the tools that sit between the user and the content. These include content players/viewers and content authoring tools. Examples of applications in this category include the Amazon Kindle app, PDF viewer applications, the Word or PowerPoint editors, and various Internet Browsers, to name few. The applications referred to as productivity tools fall in this category too. Here, relevance is carried by the content produced or reviewed.

The second category covers applications that aggregate content on user's behalf. For example, the New York Times, Flipboard (or Twitter) iPad applications. Though the user has different relationships with the source, these applications are content aggregators/providers. As such, they allow for easy content relevance transfer from the content promoted to the applications themselves. Games (social or not), location based services and verticals, and Facebook, to name few fall in the content providers category. The application relevance is based on the interaction observed over the entire content length touched by the user. For instance, if we read in full every single New York Times article we open, New York Times application would have achieved a high score and would become the basis other applications compare with. It is important to note that the aggregate content length can be defined as a superposition of textual document length, visual media length, game length, etc. The relevance can further be a superposition of the relevance as determined in each media category. The generic objective relevance measure definition is preferably used.

The definition of relevance given for the second application category can be transferred onto the first category. However before doing so, it is preferably to break down the first application category into one or more segments. The motivation behind defining segments is due to the fact that one should not compare movie-producing tools with text or code editors, for instance. Once broken into logical segments, human assisted relevance can be calculated for the applications in the segment. Once again, the relevance is over the user touched content, but this time only content within the segment is considered.

Aggregating application relevance statistics from multiple users forms the basis for comparing and ranking applications in large pools like the Apple App Store, Google's Android Market, and Nokia's Ovi store. Ranking application in the store requires either gathering raw usage statistics from users and aggregating the statistics at a store level, or collecting a pre-aggregated user level rank and transferring the individual's rank to the store by simple reference counting. One can calculate rank in a particular store category, instead of rank in the overall store. More complex statistical approaches can be used when aggregating raw user event data. Regardless of the statistical method used, the calculations are based on monitoring one or more user generated events indicative of content relevance. This relevance, generally defined as a number of installations, does not allow for high quality applications to reach their targeted audience(s) in a saturated market place. The new relevance definition provided herein, works around this limitation and allows for a late coming application to rank well within the store even if the store or application category are oversaturated.

Document relevance statistics from multiple users define the overall document relevance in a given document category and/or document store. The term document is interchangeable with the term book in the case of an electronic bookstore. Online document/book repositories (or merchants) like Amazon, or Scribed, for example, can serve more relevant content if a relevance definition based on user activity events is adopted throughout the store categories and the store overall. This defines yet another alternative embodiment.

Most of the discussion above is focused on how the document (e.g., a book or application) relevance is measured quantitatively and objectively, and how the information related to the most relevant documents is persisted and retrieved later. It should be noted that the user interaction with the document is being monitored extensively, however, this is preferably done in a stealth mode. Therefore, the user is not required to perform any special actions apart from the regular activities that are performed with the document within the application.

Figure 9:
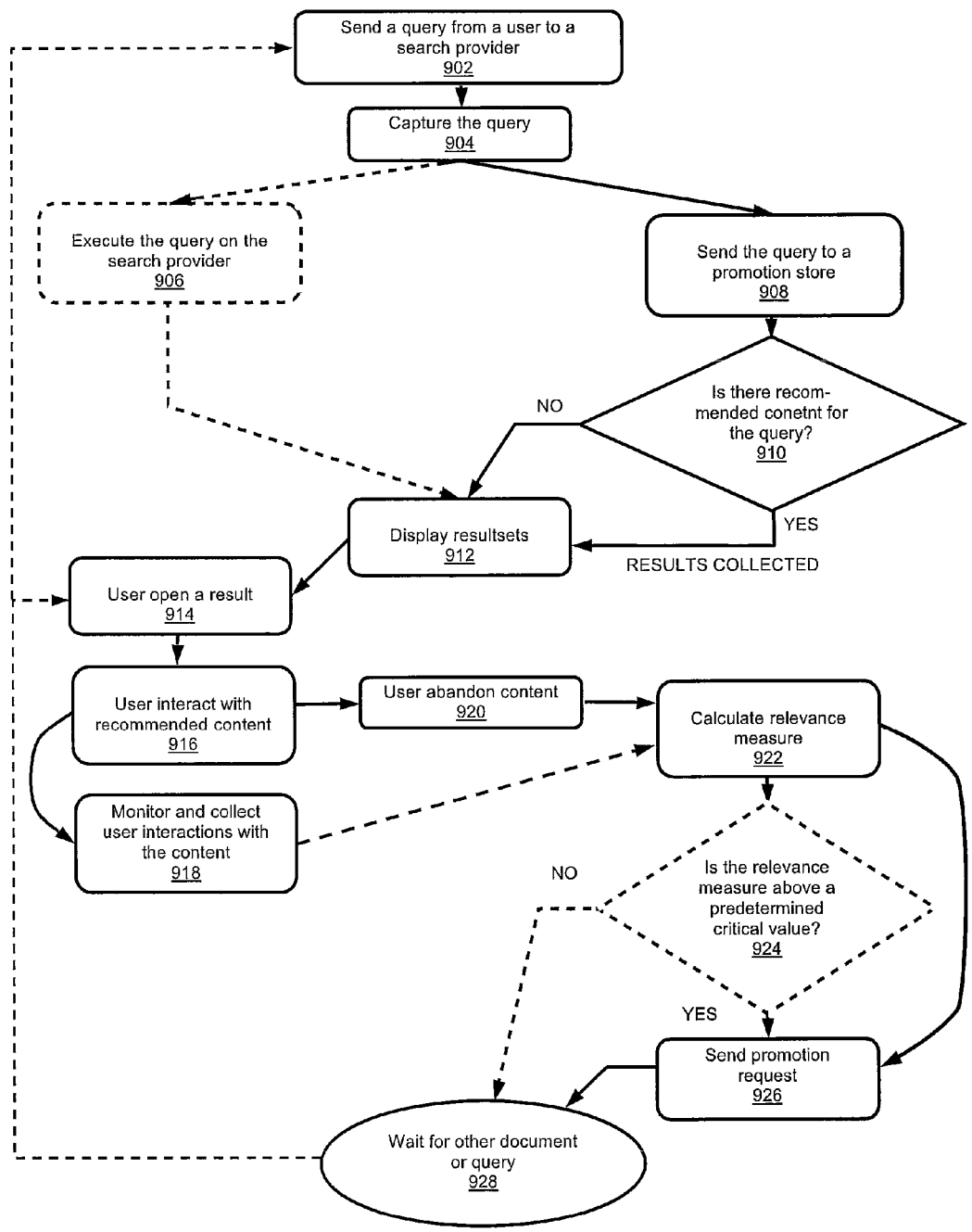
FIG. 9 illustrates a process for ranking the contents of one or more documents through human assistance.

FIG. 9 illustrates a process for ranking contents of one or more documents, applications, sound or visual media through human assistance. The term "document" as used in the discussion below refers to either document, application, sound or visual media. At step 902, a user sends a query to a search engine. The query is provided to search for documents required by the user. Subsequently, at step 904, the query is captured by a client application. In an embodiment of the invention, the client application is an operating system component. In another embodiment of the invention, the client application is a standalone application executing on a device of the user. In another embodiment, the client application is a statically or dynamically linked library. In yet another application embodiment an application plugin is provided that works with the document host. Thereafter, at step 906 (an optional step), the search engine serves the original query request. The search engine searches for content relevant to the user based on the query. Further, the captured query is sent to promotion stores, at step 908. The captured query is executed on the promotion stores for retrieving content important to the user based on the query.

At step 910, the promotion store determines if documents in the store are relevant. Subsequently, at step 912, the results from the execution of the search query by the search engine and the results obtained from the promotion store are displayed. While displaying result, items from the search engine (if retrieved) can be rearranged or denoted as items also available in the store. Thereafter, the user opens a document at step 914 and the interaction between the user and the document commences at step 916. The interaction events between the user and the document are monitored and collected at step 918. The recommended events include, but are not limited to: pointer or keyboard related scrolling, pointer clicks, zooming, keyboard data entry events, printing, saving, book-marking, copying document location (as a Universal Resource Locator—URL; file location if local; Uniform Resource Identifier—URI; etc.), navigating away, switching to a different application or application tab. Apart from the richness of the events supported, other software module implementation details are not in any way limiting to the present embodiment.

When the document is closed at step 920, the interaction events collected are used to calculate the document relevance measure at step 922. The relevance measure is calculated based on the events and the captured query. The mathematical expression for the calculation of the relevance measure is discussed in detail in conjunction with FIG. 2. Subsequently, at the optional step 924 it is determined whether the relevance measure is above a predetermined critical value. In an embodiment of the invention, the predetermined critical value is decided by the user. In another embodiment of the invention, the predetermined critical value is decided by the client application based on the preferences and events monitored between the user and the documents.

In a case where the relevance measure is above the predetermined critical value, a promotion request is sent at step 926. In another embodiment, no critical value exists and all the context, content, relevance vectors 1002 are sent to the promotion store in step 926. In an embodiment of the invention the promotion request reaches a local promotion store. In another embodiment of the invention, the promotion request is sent to other users in the network to provide a rank to the documents. In case the optional 924 is executed and the relevance measure is below the predetermined critical value, then the events cache is cleared and the process proceeds to step 928. Step 928 is an idle state until another content is opened or another query is executed.

In certain embodiments, the only input coming from a user is after the search engine and the promotion store return their list of recommendations. At that point the software module 200 can adjust the search engine's native page and injects human recommendations from the promotion store. Displaying the recommendations in a separate section directly on the search engine's page is beneficial to the user, as all the results are available on a single page. Therefore, selecting any result is quick and convenient. Alternatively, the results can be listed in a sidebar, separate window, or application toolbar, if the document host application allows for these extensions. The result merge step is optional, since the user may decide to rely entirely on the information kept in the promotion store and skip gathering data from external engines altogether. In case only promotion store results are displayed, it is up to the document host application discretion where the results will appear.

The embodiments of the invention provide various advantages. These advantages of the embodiments will become apparent from a consideration of the ensuing description and accompanying drawings. The embodiments provide a lighter and more reliable document content rank evaluation system and method.

The document, application, sound, or visual media relevance (rank) is defined and evaluated in the terms of the last query. Moreover, the relevance is measured in part by human behavior and as a result produces human quality recommendations. The embodiments of the invention enable implicit soliciting and non-intrusive recommendations which help in achieving better document coverage that is faster than the explicit tagging systems, while also considering the same size user population. Furthermore, embodiments of the present invention allow users to rely more heavily on each other's recommendations, thereby making external promotion mechanisms less relevant and attractive. Consequently, the algorithmic results of the existing search engines can improve.

The embodiments of the invention provide a quantitative way of measuring document, application, sound, and/or visual media relevance in the context of a search query or, in case of direct content fetch, in the context defined by the content author tags. Therefore, the results and recommendations are objective. Further, the links between the document, application, sound or visual media and the query terms in which the content was found relevant are preserved. As a result, a popular content will preferably not spawn into unrelated semantic areas. Embodiments of the invention do not require the user to visit alternative search engines or abandon his/her preferred search provider. Moreover, the quantitative document, application, sound or visual media measure can be fine tuned to a particular user content navigation experience and habits.

Embodiments of the invention enable the document, application, sound or visual media relevance to be evaluated, persisted and retrieved in absence of external authorities that dictate the content rank (e.g., inbound link statistics on the Web) on a local file system or in a highly fragmented peer-to-peer like network. Existing search engines rely on link quality and publicly accessible documents while evaluating document content rank, therefore, measuring document rank in a fragmented network or local system may be problematic for them. It is difficult negatively influencing the content ranking process of the present invention.

The human assisted document, application, sound or visual media content ranking embodiments can be used to provide quality recommendations supplemental to or in lieu of the existing search engine lists. The human assisted content ranking system also provides additional advantages. The embodiments of the present invention enable human driven recommendations to supersede the algorithmic recommendations, because of the higher quality of the human recommendations. The document relevance is measured in its semantic context as perceived by the actual content consumer. Due to the distributed way in which the recommendations are collected and later promoted, the relevance measure is difficult to deceive or influence. The embodiments of the invention allow the content rank to be measured objectively on the local file system, in a highly fragmented network with no or a limited number of interconnecting links between the content pieces. The coverage is gained faster than in a similar sized tagging system that relies on explicit actions taken by the user of the tagging system, due to the implicit nature of recommendation gathering. The embodiments of the invention allow fine-tuning of the content rank measure to a particular user behavior.

The embodiments of the invention integrate well with existing content host applications (and operating systems in case the content itself is an application) and provide for a seamless user experience. The user graphical interface is clear and familiar and helps the user to quickly locate the new recommendations and start navigating them. The embodiments allow for information lookup, trend identification, as the recommendations solicited have an implicit time component embedded. Further, the associated highly relevant documents, applications, sound or visual media already identified and collected can be easily presented in a trendy context.

Although the description contains many examples and specific mentions, these should not be considered as limiting the scope of the embodiments, but as merely providing illustrations of some of the presently preferred embodiments. For example, the content relevance measure can be defined in other common sense terms by substituting the logarithm of time with another slowly increasing function. The link depth can be considered while calculating the measure in certain embodiments. User actions considered vary between content types. Different coefficient values give different weight to different user actions and generally can be user fitted. In addition, the promotion store can have different structure and capture information in addition to the basic ⟨context, document⟩ vector and/or promotion count. More complex distributed network topology in the peer-to-peer embodiment may lead to more consistent recommendations across the entire network (leveraging sampling in a way similar as in some inverse keyword index studies); adding geography component to the store or the lookup request may lead to advanced local community oriented solutions. The real-time search realm can be entered, considering the document, application, sound and/or visual media promotion time, and the query context in which the promotion took place. This provides information such that a list of content tied to trendy topics, conversations, etc. can be constructed and presented to the user.

Thus the scope of the embodiments should be determined by the appended claims and their legal equivalents, rather than by the examples discussed.

This written description uses examples to disclose the invention, including the best mode, and also to enable any person skilled in the art to practice the invention, including making and using any devices or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
a memory; and
a processor, coupled to the memory and to:
   capture a search query responsive to which at least one of one or more documents, applications, sound, or visual media are provided;

determine, that a user has navigated the at least one of the one or more documents, applications, sound or visual media for at least a defined period of time, the defined period of time being defined based on at least one of (a) a length of the at least one of the one or more documents, applications, sound or visual media, (b) a word count of the at least one of the one or more documents, or (c) a fragmentation of the at least one of the one or more documents, applications, sound or visual media;

monitor, in relation to the at least one of the one or more documents, applications, sound or visual media, and based on a determination that the user has navigated the at least one of the one or more documents, applications, sound or visual media for at least the defined period of time, one or more interaction events, the one or more interaction events comprising one or more user behaviors that demonstrate interest in the at least one of the one or more documents, applications, sound or visual media, each of the one or more interaction events having a respective weight that reflects a relative significance of the interaction event in relation to a relevance of the one or more documents, applications, sound or visual media to the search query; and provide a relevance measure for the at least one of the one or more documents, applications, sound or visual media based on a respective weight associated with the one or more interaction events.

2. The system of claim 1 further comprising:
one or more promotion stores configured to at least one of:
store one or more ranked documents, applications, sound or visual media;
store one or more vectors that are based on the captured search query and the one or more documents, applications, sound or visual media;
store one or more vectors that are based on keyword tags associated with the one or more documents, applications, sound or visual media and the documents, applications, sound or visual media; or
store one or more promotion counters associated with one or more vectors.

3. The system of claim 1, further comprising a client application stored in the memory, the client application comprising at least one of an operating system component, an application plug-in, or a stand alone application.

4. The system of claim 3, wherein the client application is to:
determine whether the relevance measure is above a predetermined value;
link the at least one of the one or more documents, applications, sound or visual media to a semantic domain when the relevance measure is greater than the predetermined value; and
persist one or more semantic links to the at least one of the one or more documents, applications, sound or visual media.

5. The system of claim 4, wherein the semantic domain is perceived based on the captured search query.

6. The system of claim 1, wherein the one or more interaction events comprise at least one of: document printing, document saving, document copying, document bookmarking, document address copying, a plurality of document visits, keyboard data entry, document scrolling, pointer clicking, document zooming, document switching, time spent reading the document, document navigation, document content highlighting, document content bookmarking, document content emailing, or document address emailing.

7. The system of claim 6, wherein the time spent reading the document is normalized based on a superposition of at least one of:
a length of the document; or
a static image complexity of the document; or
a fragmentation of the document.

8. The system of claim 1, wherein the one or more interaction events comprise at least one of: media play count, media content printing, media content saving, media content copying, media content bookmarking, media address copying, media content scrolling, media content pointer clicking, media content switching, time spent watching or listening to media content, media content emailing, or media address emailing.

9. The system of claim 8, wherein the time spent consuming the media is normalized based on a length of the media.

10. The system of claim 1, wherein the one or more interaction events comprise at least one of: application installation count, time spent using the application, application content printing, application content saving, application content copying, application content bookmarking, application content address copying, application content number of visits, application content scrolling, application content pointer clicking, application content zooming, application content switching, time spent reading application content, application content highlighting, application content emailing, application content address emailing, or application address emailing.

11. The system of claim 10, wherein the amount of time spent in using the application is normalized based on at least one of or a superposition of at least two of:
a length of the documents;
an expected par time in a gaming application;
a sound media length in time;
a video media length in time;
a static image complexity;
a fragmentation.

12. The system of claim 10, wherein the one or more interaction events comprise at least one of: levels completed in a gaming application, scenes completed in a gaming application, or checkpoints completed in a gaming application.

13. The system of claim 12, wherein the amount of time spent playing the game is normalized based on at least one of:
a game length in levels;
a game length in schemes; or
a game length in checkpoints.

14. The system of claim 1, wherein the processor is further to provide one or more search results based on the relevance measure of the at least one of the one or more documents, applications, sound or visual media.

15. The system of claim 1, further comprising a display to display one or more search results based on the relevance measure of the at least one of the one or more applications, applications, sound or visual media.

16. The system of claim 1, further comprising a display to display one or more search results.

17. A method comprising:
capturing a query for one or more documents, applications, sound or visual media;
determining, with a processor, that a user has navigated at least one of the one or more documents, applications, sound or visual media for at least a defined period of time, the defined period of time being defined based on at least one of (a) a length of the at least one of the one or more documents, applications, sound or visual media, (b) a word count of the at least one of the one or more documents, or (c) a fragmentation of the at least one of the one or more documents, applications, sound or visual media;

monitoring, in relation to the at least one of the one or more documents, applications, sound or visual media, and based on a determination that the user has navigated the at least one of the one or more documents, applications, sound or visual media for at least the defined period of time, one or more interaction events, the one or more interaction events comprising one or more user behaviors that demonstrate interest in the at least one of the one or more documents, applications, sound or visual media, each of the one or more interaction events having a respective weight that reflects a relative significance of the interaction event in relation to a relevance of the one or more documents, applications, sound or visual media to the query; and providing a relevance measure for the at least one of the one or more documents, applications, sound or visual media based on a respective weight associated with the one or more interaction events.

18. The method of claim 17 further comprising sending the captured query to one or more promotion stores for the documents, applications, sound or visual media.

19. The method of claim 17, wherein at least one of the capturing, determining, monitoring, or providing are performed in conjunction with at least one of an operating system component, application plug-in, or stand-alone application.

20. The method of claim 17 further comprising determining if the relevance measure is above a predetermined value.

21. The method of claim 20 further comprising linking the at least one of the one or more documents, applications, sound or visual media to a semantic domain when the relevance measure is greater than the predetermined value.

22. The method of claim 21, wherein the semantic domain is perceived based on the captured query.

23. The method of claim 21 further comprising persisting a semantic link to the at least one of the one or more documents, applications, sound or visual media.

24. The method of claim 17, wherein the one or more interaction events comprise at least one of: document printing, document saving, document copying, document bookmarking, document address copying, a number of document visits, keyboard data entry, document scrolling, pointer clicking, document zooming, document switching, time spent reading the document, document navigation, document content highlighting, document content bookmarking, document content emailing, or document address emailing.

25. The method of claim 24, further comprising normalizing the time spent reading the document based on at least one of or a superposition of at least one of:
   a length of the document;
   a static image complexity of the document; or
   a fragmentation of the document.

26. The method of claim 17, wherein the one or more interaction events comprise at least one of: media play count, media content printing, media content saving, media content copying, media content bookmarking, media address copying, media content scrolling, media content pointer clicking, media content switching, time spent watching or listening to media content, media content emailing, or media address emailing.

27. The method of claim 26, further comprising normalizing the time spent consuming the media based on a length of the media.

28. The method of claim 17, wherein the one or more interaction events comprise at least one of: application installation count, time spent using the application, application content printing, application content saving, application content copying, application content bookmarking, application content address copying, application content number of visits, application content scrolling, application content pointer clicking, application content zooming, application content switching, time spent reading application content, application content highlighting, application content emailing, application content address emailing, or application address emailing.

29. The method of claim 28, further comprising normalizing the time spent in using the application based on at least one of or a superposition of at least of:
   a length of the documents;
   an expected par time in a gaming application;
   a audio media length in time;
   a video media length in time;
   a static image complexity;
   a fragmentation.

30. The method of claim 28, wherein the one or more interaction events comprise at least one of: levels completed in a gaming application, scenes completed in a gaming application, or checkpoints completed in a gaining application.

31. The system of claim 30, wherein the amount of time spent playing the game is normalized based on:
   a game length in levels;
   a game length in schemes; or
   a game length in checkpoints.

32. The method of claim 17, further comprising providing one or more search results based on the relevance measure of the at least one of the one or more documents, applications, sound or visual media.

33. A non-transitory computer-readable medium encoded with instructions executable by a processor for performing operations comprising:
   capturing a query for one or more documents, applications, sound or visual media;
   determining, that a user has navigated at least one of the one or more documents, applications, sound or visual media for at least a defined period of time, the defined period of time being defined based on at least one of (a) a length of the at least one of the one or more documents, applications, sound or visual media, (b) a word count of the at least one of the one or more documents, or (c) a fragmentation of the at least one of the one or more documents, applications, sound or visual media;
   monitoring, in relation to the at least one of the one or more documents, applications, sound or visual media, and based on a determination that the user has navigated the at least one of the one or more documents, applications, sound or visual media for at least the defined period of time, one or more interaction events, the one or more interaction events comprising one or more user behaviors that demonstrate interest in the at least one of the one or more documents, applications, sound or visual media, each of the one or more interaction events having a respective weight that reflects a relative significance of the interaction event in relation to a relevance of the one or more documents, applications, sound or visual media to the query; and
   providing a relevance measure for the at least one of the one or more documents, applications, sound or visual media based on a respective weight associated with the one or more interaction events.

34. The non-transitory computer-readable medium of claim 33, further encoded with instructions executable by the processor for performing operations comprising:
- determining whether the relevance measure is above a predetermined value;
- linking the at least one of the one or more documents, applications, sound or visual media to a perceived semantic domain when the relevance measure is greater than the predetermined value; and
- persisting the link to the at least one of the one or more documents, applications, sound or visual media.

* * * * *